United States Patent
Peddinti et al.

(10) Patent No.: US 10,460,348 B1
(45) Date of Patent: Oct. 29, 2019

(54) SELECTION OF CONTENT ITEMS BASED ON INTERNET ACTIVITY DATA AGGREGATED FROM A CONTENT PROVIDER NETWORK

(71) Applicant: Google Inc., Mountain View, CA (US)

(72) Inventors: Raghava Viswa Mani Kiran Peddinti, Sunnyvale, CA (US); Lakshmi Kumar Dabbiru, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 688 days.

(21) Appl. No.: 14/920,389

(22) Filed: Oct. 22, 2015

(51) Int. Cl.
*G06Q 30/02* (2012.01)

(52) U.S. Cl.
CPC ..... *G06Q 30/0256* (2013.01); *G06Q 30/0277* (2013.01)

(58) Field of Classification Search
CPC .................................................. G06Q 30/0256
See application file for complete search history.

(56) References Cited

U.S. PATENT DOCUMENTS

| | | | |
|---|---|---|---|
| 8,719,089 B1 | 5/2014 | Kent | |
| 2008/0052219 A1* | 2/2008 | Sandholm | G06Q 30/08 705/37 |
| 2008/0276179 A1* | 11/2008 | Borenstein | G06Q 10/10 715/736 |
| 2010/0138291 A1* | 6/2010 | Silverman | G06Q 30/02 705/14.45 |
| 2010/0180013 A1* | 7/2010 | Shkedi | H04L 67/10 709/219 |
| 2011/0060905 A1 | 3/2011 | Stack et al. | |
| 2012/0054043 A1 | 3/2012 | Agarwal et al. | |
| 2012/0323701 A1* | 12/2012 | Milgrom | G06Q 30/08 705/14.71 |
| 2013/0097028 A1* | 4/2013 | Han | G06Q 30/02 705/14.71 |
| 2014/0122253 A1* | 5/2014 | Vassilvitskii | G06Q 30/02 705/14.71 |
| 2014/0149203 A1* | 5/2014 | Narancsik | G06Q 30/0269 705/14.39 |

(Continued)

OTHER PUBLICATIONS

Zhang et al., Optimized Bidding Algorithm of Real Time Bidding in Online Ads Auction, IEEE, 2014, all pages.*

(Continued)

*Primary Examiner* — Jacob C. Coppola
(74) *Attorney, Agent, or Firm* — Foley & Lardner LLP (57) ABSTRACT

Systems and methods of selecting content items for an online ad campaign in a computerized network environment are described herein. The system can receive, from a first content provider, an event call. The event call can include an identifier and an action type. The system can receive, from a client device, a request for content, the client device associated with the identifier. The system can determine a similarity between the action type and a relevance keyword. The relevance keyword can be by a second content provider. The system can generate a bid value factor for a content item of the second content provider and a bid value factor based on the semantic similarity. The system can determine a bid value for the content item of the second content provider based on the bid value factor. The system can select, for transmission to the client computing device, the content item.

16 Claims, 5 Drawing Sheets

(56) References Cited

U.S. PATENT DOCUMENTS

| | | | |
|---|---|---|---|
| 2014/0279067 A1 | 9/2014 | Lei | |
| 2015/0134462 A1* | 5/2015 | Jalali | G06Q 30/0275 |
| | | | 705/14.71 |
| 2015/0206170 A1* | 7/2015 | Karande | G06Q 30/0242 |
| | | | 705/14.41 |

OTHER PUBLICATIONS

Shaikh et al., "Customized User Segments for Ad Targeting," IP.com, all pages. (Year: 2009).*

* cited by examiner

SELECTION OF CONTENT ITEMS BASED ON INTERNET ACTIVITY DATA AGGREGATED FROM A CONTENT PROVIDER NETWORK

BACKGROUND

In a computer networked environment such as the internet, entities such as people or companies provide information for public display on web pages or other online documents. The documents can include information provided by the entities via a computing device for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a method of selecting content items for an online ad campaign in a computerized network environment. The method can include receiving, from a first content provider computing device, an event call. The event call can comprise an account identifier and an action type. The method can include receiving, from a client computing device, a request for content, the client computing device associated with the account identifier. The method can include determining one of a subject matter similarity and a semantic similarity between the action type and a relevance keyword. The relevance keyword can be by a second content provider computing device and by a third content provider computing device. The method can include generating a first bid value factor for a content item of the second content provider computing device and a second bid value factor for a content item of the third content provider computing device based on bid value factor specifications specified by the first content provider coming device. The bid value factor specifications can specify generation of bid value factors based on one of the subject matter similarity and the semantic similarity. The first bid value factor and the second value factor each can be represented by a respective data structure and stored in the database. The method can include determining a first bid value for the content item of the second content provider computing device based on the first bid value factor retrieved from the database and a second bid value for the content item of the third content provider computing device based on the second bid value factor retrieved from the database. The method can include selecting, for transmission to the client computing device associated with the account identifier, the content item.

At least one aspect is directed to system for selecting content items for an online ad campaign in a computerized network environment. The system can include a database and a data processing system having one or more processors. The data processing system can be configured to receive, from a first content provider computing device, an event call. The event call can comprise an account identifier and an action type. The data processing system can be configured to receive, from a client computing device, a request for content, the client computing device associated with the account identifier. The data processing system can be configured to determine one of a subject matter similarity and a semantic similarity between the action type and a relevance keyword. The relevance keyword can be by a second content provider computing device and by a third content provider computing device. The data processing system can be configured to generate a first bid value factor for a content item of the second content provider computing device and a second bid value factor for a content item of the third content provider computing device based on bid value factor specifications specified by the first content provider coming device. The bid value factor specifications can specify generation of bid value factors based on one of the subject matter similarity and the semantic similarity. The first bid value factor and the second value factor each can be represented by a respective data structure and stored in the database. The data processing system can be configured to determine a first bid value for the content item of the second content provider computing device based on the first bid value factor retrieved from the database and a second bid value for the content item of the third content provider computing device based on the second bid value factor retrieved from the database. The data processing system can be configured to select, for transmission to the client computing device associated with the account identifier, the content item.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

Like reference numbers and designations in the various drawings indicate like elements.

DETAILED DESCRIPTION

Following below are more detailed descriptions of various concepts related to, and implementations of, methods, apparatuses, and systems of selecting content items for an online ad campaign in a computerized network environment. In a computer networked environment, a server can maintain in a database a log of various Internet activity on the online content that the server provides. For instance, the server can append an additional row into the server log of Internet activity, whenever the server receives a request for content, clicks or hovers-over on various content items shown on webpages, or purchase orders. Using the server database log, a content provider may be able to determine the performance of the online advertisement campaigns.

With the development of websites and applications dedicated to specific tasks, log data regarding Internet activity of client computing devices on such websites and applications can be confined to the respective servers. For instance, a client computing device may make a purchase order for a television set via an electronic merchandiser's mobile application and then may submit a search query for television accessories on a search engine via a web browser. The log data regarding these Internet activities, however, may remain confined in the databases of electronic merchandiser's server and the search engine servers, respectively. While accumulating more Internet activity data in general may lead to content provider servers selecting better performing content items, directly sharing such data with one another may not be desirable due to data protection and security concerns.

The systems and methods described herein can leverage Internet activity log data maintained across databases of servers to enhance the performance of online advertisement campaigns while maintaining data protection. The systems and methods can facilitate an online advertising framework that can create a network among content provider and content publisher servers to utilize anonymized Internet activity log data for selection of online content.

At the center of the online advertising framework, a data processing system such as at least one centralized server, can receive and maintain a database of Internet activity log data received from content publisher and content provider servers. The Internet activity log data may include a database entry recorded at the content provider or content publisher server. Each entry may include elements, such as an account identifier, action type, and a product or service identifier. Action types may include interactions with online content, such as viewing a product page, making a purchase order online, or subscribing for a service, among others. The data processing system can generate and associate another, anonymous account identifier to each database entry to replace the account identifier used by the content publisher or content provider server.

By making use of the Internet activity log data in centralized databases, when the data processing system receives a request for content from a client computing device, the data processing system can identify which content publisher and which content item of the content publisher to serve. The request for content can include, for example, a search query for a search engine. The data processing system can perform a look up to identify other Internet activity log data associated with the client computing device based on the account identifier stored in the database. The data processing system can also run a semantic or subject matter similarity analysis using natural language processing algorithms to identify related keywords to the search query of the request.

Based on the identified keywords, the data processing system can search for content items provided by content provider servers. For example, the client computing device can transmit a purchase order for a television set via an electronic merchandiser A's mobile application. Thereafter, the same client computing device can submit a query for television accessories on via a web browser a search engine. As part of the online advertising framework, a server for electronic merchandiser A's mobile application and a server for the search engine may communicate the Internet activity of the client computing device with the data processing system. In this example, the data processing system can identify that the same client computing device is associated with both the purchase order and the search query based on the account identifier stored in the database. The data processing system can then identify keywords related to the purchase order and search query to identify other content publishers or content providers, such as a furniture manufacturer and electronics merchandiser B.

The data processing system can receive bid value factor specifications from content publishers, and can bias the selection of content items by determining its own bid value factors. Based on the bid value factor specifications, the data processing system can bias the selection of content items among different content publishers. The bid value factor specifications can indicate other content provider or content publisher computing devices that can make use of Internet activity log data originating from the source content provider or publisher computing device can. Referring to the previous example, the data processing system can receive bid value factor specifications from the electronics merchandiser A server, indicating a bid value factor of 5 for a content item of a furniture manufacturer but 0.1 for content items of other electronics merchandisers. For example, both the original bid values of the furniture manufacturer and the original bid value of electronics merchandiser B can be a number such as 5. In this example, the data processing system can apply the bid value factor to adjust the bid values of the furniture manufacturer (5×5=25) and electronics merchandiser B (5×0.1=0.5). Since the adjusted bid value of the furniture manufacturer is greater than the adjusted bid value of electronics merchandiser B, The data processing system can then select a content item of the furniture manufacturer over the a content item of electronics merchandiser B.

In these examples, the content publisher and content provider servers do not share Internet activity log data with one another directly. Rather, the data processing system can act as the intermediary to facilitate the utilization of Internet activity log data to select better performing online content.

Figure 1:
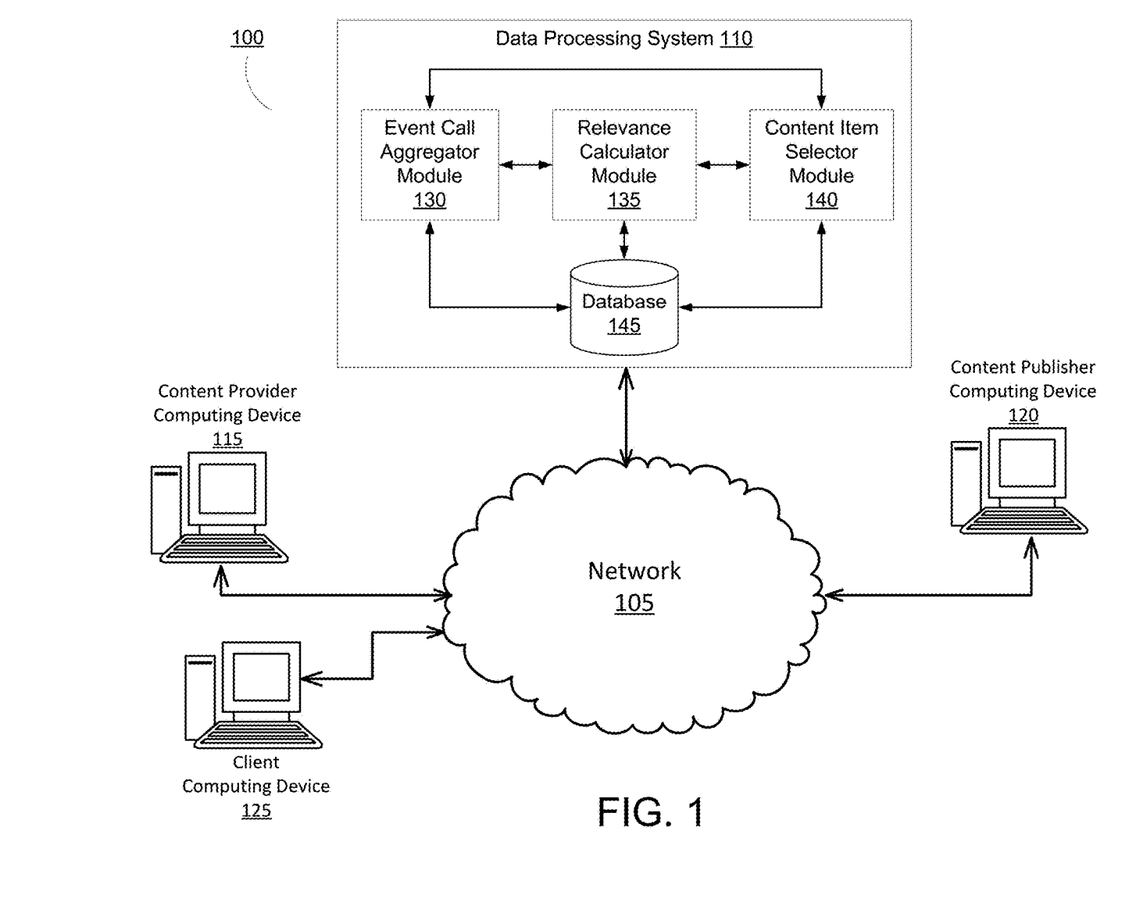
FIG. 1 is a block diagram depicting one example computer networked environment for selecting content items for an online ad campaign in a computerized network environment, according to an illustrative implementation.

FIG. 1 is a block diagram depicting one example computer networked environment 100 to match identifiers between different datasets, according to an illustrative implementation. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for example with at least one content provider computing device 115, at least one content publisher computing device 120, or at least one client computing device 125.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 110. The data processing system 110 can each include at least one logic device such as a computing device having a processor to communicate via the network 105, for example with the client computing device 125, the web site operator or content publisher computing device 115, and at least one content provider computing device 125. The data processing system 110 can each include at least one server. For example, the data processing system 110 can each include a plurality of servers located in at least one data center. The data processing system 110 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform. Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 110 can include an event call aggregator module 130, a relevance calculator module 135, a content selector module 140, and at least one database 145. The event call aggregator module 130, relevance calculator module 135, or content selector module 140 can include at least one processing unit or other logic device such as a programmable logic array engine, or module configured to communicate with the database 145. The event call aggregator module 130, relevance calculator module 135, and content selector module 140 can be separate components, a single component, or a part of the data processing system 110. The system 100 and its components, such as a data processing system, may include hardware elements, such as one or more processors, logic devices, or circuits.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

At least one content provider computing device 115 can include servers or other computing devices operated by a content provider entity to provide content items such as advertisements for display on information resources at the client computing device 125. The content provided by the content provider computing device 115 can include third party content items (e.g., ads) for display on information resources such as a website or web page that includes primary content, e.g. content provided by the content publisher computing device 120. The content items can also be displayed on a search results web page. For example, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other client computing device 125.

At least one content publisher computing device 120 can include servers or other computing devices operated by a content publishing entity to provide primary content for display via the network 105. For example, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing device 115. For example, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The client computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The client computing device 125, the content provider computing device 115, and the content publisher computing device 120 can include desktop computers, laptop computers, tablet computers, smartphones, personal digital assistants, mobile devices, client devices, consumer computing devices, servers, clients, and other computing devices. The client computing device 125, the content provider computing device 115, and the content publisher computing device 120 can include user interfaces such as microphones, speakers, touchscreens, keyboards, pointing devices, a computer mouse, touchpad, or other input or output interfaces.

The event call aggregator module 130 can receive an event call from a first content provider computing device 115 or a content publisher computing device 120 via the network 105. The event call can be indicative of an action by the client computing device 125 with the respective content provider computing device 115 or respective content publisher computing device 120 via the network 105. For example, the event call can be indicative of a request for a content item of the respective content provider computing device 125 from the client computing device 125. The event call can be logged at a database associated with the respective content provider computing device 115 or respective content publisher computing device 120. The event call aggregator module 130 can aggregate, save, maintain, or otherwise store the event call onto the database 145. The event call aggregator module 130 can append the event call to an existing log on the database 145 arranged by a content provider computing device identifier, a content publisher computing device identifier, or an identifier corresponding to the client computing device 125.

The event call can include an account identifier, account identifier type, source identifier, action type, and action descriptors. The account identifier can identify one or more client computing devices 125 that performed the action corresponding to the event call. The account identifier can be, for example, an email address, user identification, device identification, or screenname, or any alphanumerical value. The account identifier type can indicate a type of the account identifier. For example, if the account identifier is an email address associated with the client computing device 125, the account identifier type can indicate that the account identifier is an email address. The source identifier can identify the first content provider computing device 115 or the content publisher computing device 120. The source identifier can be, for example, an network address (e.g., IP address or hostname), name of the content provider or publisher, or a randomly generated alphanumeric value, among others. The action type can indicate the type of action taken by the client computing device 125 logged by the respective content provider computing device 115 or respective content publisher computing device 120. The action type can include, for example, a click or hover-over of a content item, a purchase order, a subscription, and a request for online content, among others. The action descriptor or descriptors can include properties of the action type taken by the client computing device 125, such as an action time stamp, action duration, and action count, among others. For example, if the action type is a purchase order, the action descriptors can include item identifier of the product or service purchased, a time stamp indicating when the transaction occurred, and a time duration field indicating how long the web visit session was.

The event call can be an application programming interface (API) data structure, such as a structure, object class, and table, among others. For example, the pseudo-code data structure of the event call can be of the form:

```
{
API_ID: <API ID of Content Provider>
API_SECRET_KEY: <API Secret Key for Content Provider>
  USER: [
    {
    USER_ID: <AUID provided by Data Processing System for the user>
    USER_ID_TYPE: <type of the user ID>
    }
  ]
ACTION_TYPE: "User.Conversion.Purchase"
ACTION_PAYLOAD: {
  ACTION_TIME: <time stamp>
  ACTION_DURATION: <time to take the action>
  ACTION_COUNT: <no of times>
  ITEM: {
    ITEM_ID: < >
    ITEM_TITLE: < >
    ITEM_URL: < >
  }
 }
}
```

The event call aggregator module 130 can generate another account identifier corresponding to the one or more client computing devices 125 to replace the account identifier received from the content provider computing devices 115 or the content publisher computing devices 120. For example, while storing the event call at the database 145, the event call aggregator module 130 can create a random alphanumerical value for the account identifier field of the event call data structure. Once stored, the event call aggregator module 130 and the data processing system 110 may not be able to send the event call to other content provider computing devices 115 or other content publisher computing devices 120. By generating another account identifier and storing the account data in this manner, the event aggregator module 130 can sanitize or anonymize the event call stored in the database 145, thereby achieving data privacy.

The event call aggregator module 130 can also associate the account identifier of the event call received from the content provider computing devices 115 or the content publisher computing devices 120 with the another account identifier generated by the event call aggregator module 130. For example, the data processing system 110 can receive a request for content of a content provider computing device 115 from an client computing device 125, and then create a random alphanumerical value as another account identifier to identify the client computing device 125. The data processing system 110 can then send the request for content to the content provider computing device 115, and in return receive an event call from the content provider computing device 115. In this example, the event call aggregator module 130 can associate the account identifier of the event call with the other account identifier generated by the event call aggregator module 130. When the event call aggregator 130 receives another event call from the another content provider computing device 115, the event call aggregator module 130 can perform a search on the database 145 for the other account identifier, and then repeat.

The data processing system 110 can receive or intercept a request for content from the client computing device 125. The request for content can include an account identifier, a search query, a content provider computing device identifier, and a content publisher device identifier, among others. The data processing system 110 can transmit the request for content to the respective content provider computing device 115 corresponding to the content provider computing device identifier or the respective content publisher computing device 120 corresponding to the content publisher computing device identifier specified in the request. The data processing system 110 can determine or identify that the client computing device 125 corresponds to the account identifier of the event call received from the first content provider computing device 115. As detailed below, the data processing system 110 can perform additional processing on the request for content (e.g., executing semantic analysis algorithm), prior to or independent of transmitting the request to the respective content provider computing device 115 or the content publisher computing device 120.

The relevance calculator module 135 can determine a subject matter similarity or a semantic similarity among the action type including action descriptors, a relevance keyword, and the search query of the request. The subject matter similarity and the semantic similarity can each include a similarity measure, score, or distance, indicating the relatedness of at least two of the action type, the relevance keyword, and the search query of the request.

The relevance keyword can be designated by a second content provider computing device 115 and a third content provider computing device 115. The relevance keyword may indicate search query strings that any of the one or more content provider computing devices 115 has bid or designated as part of an online advertising campaign. For example, any one of the one or more content provider computing devices 115 can bid on to make use of event calls containing a particular action type or descriptor in selecting content items of the respective content provider computing device 115.

The relevance calculator module 135 can apply any number of natural language algorithms to determine a semantic similarity among the action type, the relevance keyword, and the search query of the request. The relevance calculator module 135 can normalize at least two of the action type, the relevance keyword, and the search query. The relevance calculator module 135 can separate any one of the action type, the relevance keyword, and the search query into individual strings and identify the lexicographic roots within each string using stemming or lemmatizing algorithms. For example, if the search query is "smartphone casing" and one of the action descriptor logged is "case," the relevance calculator module 135 can separate the search query into two strings "smartphone" and "casing." Using a dictionary of a stemming algorithm, the relevance calculator module 135 can perform a search for the second string of the search query "casing" to identify a match between "casing" and "case," and determine that there is a semantic similarity between the search query and the action descriptor.

The relevance calculator module 135 can apply any number of natural language algorithms to determine a subject matter similarity among the action type, the relevance keyword, and the search query of the request. The relevance calculator module 135 can use a subject matter network to determine the subject matter similarity or semantic similarity. The subject matter network may be a data structure comprising a unidirectional or bidirectional graph identifying predefined relationships and distances between each node that corresponds to a word or a phrase. The distances may indicate how closely related or relevant each or phrase word corresponding to each node may be. For example, in the subject matter network, a node corresponding to the word "television" may be connected to two nodes corresponding to "television stand" and "electric plug" with distances of "0.8" and "1.4" respectively, indicating that the word "television" is more related to the word "television stand" than "electric plug." Using such a subject matter network, the relevance calculator module 135 can identify nodes corresponding to at least two of the action type, the relevance keyword, and the search query. The relevance calculator module 135 can then determine the distances specified in the subject matter network between the nodes corresponding to at least two of the action type, the relevance keyword, and the search query. The relevance calculator module 135 can calculate the subject matter similarity based on the distances specified in the subject matter network. For example, the relevance calculator module 135 can calculate the subject matter similarity by weighing the distances of the words in the search query to the words in the action type based on the sequence of the words within the search query.

The relevance calculator module 135 can determine the semantic similarity of any permutation of the action type, the relevance keyword, and the search query. The relevance calculator module 135 can normalize all of the action type, the relevance keyword, and the search query. The relevance calculator module 135 can separate at least one of the action type, the relevance keyword, and the search query into individual strings and identify the lexicographic roots within each string using stemming or lemmatizing algorithms. Using a dictionary of a stemming or lemmatizing algorithm, the relevance calculator module 135 can perform a search for a match among the normalized action type, the relevance keyword, and search query.

The relevance calculator module 135 can determine the subject matter similarity of any permutation of the action type, the relevance keyword, and the search query. The relevance calculator module 135 can use the distances between nodes specified in subject matter network to determine the subject matter similarity. For example, if the product purchased of the action descriptor is "Company A television," the search query is "television stand," and the relevance keyword is "television," the relevance calculator module 135 can identify which nodes correspond to these words and phrases and calculate the semantic distances among the nodes. The relevance calculator module 135 can then calculate a sum of the distances among the nodes as the subject matter similarity.

The relevance calculator module 135 can identify the second content provider computing device 115 and the third content provider computing device 115 based on one of the subject matter similarity and the semantic similarity among at least two of the action type, the relevance keyword, and the search query. The relevance calculator module 135 can identify, responsive or subsequent to receiving the event call, one or more relevance keywords based on the action type. For example, the relevance calculator module 135 can search the subject matter network for a node corresponding to the action descriptor of the event call. Once the node is identified, the relevance calculator 135 can identify one or more other nodes connected to the node corresponding to the action descriptor in the subject matter network. The relevance calculator 135 can identify one or more content provider computing devices 115 that designated the relevance keyword corresponding to the identified nodes in the subject matter network. The relevance calculator module 135 can identify, responsive or subsequent to receiving the search query, the one or more relevance keywords based on the search query. For example, the relevance calculator module 135 can search the subject matter network for a node corresponding to the search query. Once the node is identified, the relevance calculator 135 can identify one or more other nodes connected to the node corresponding to the search query in the subject matter network. The relevance calculator 135 can identify one or more content provider computing devices 115 that designated the relevance keyword corresponding to the identified nodes in the subject matter network.

The content selector module 140 can generate a first bid value factor for a content item for the second content provider computing device 115 and a second bid value factor for a content item of the third content provider computing device 115 based on the semantic similarity or the subject matter similarity. The bid value factors may be indicative of how to bias the determination of bid values for selecting content items of one or more content provider computing devices 115. For example, the content selector module 140 can generate higher bid value factors for content items of content provider computing devices 115 whose relevance keywords have higher semantic similarity or subject matter similarity than content items of content provider computing devices 115 whose relevance keywords have lower semantic similarity or subject matter similarity.

The content selector module 140 can generate the first bid value factor for a content item for the second content provider computing device 115 and the second bid value factor for a content item of the third content provider computing device 115 based on bid value factor specifications specified by the first content provider coming device 115. The bid value specifications can be indicative of how to bias the generation and determination of bid value factors for content items of each of each of the one or more content provider computing devices 115. The bid value factor specifications can specify generation of bid value factors based on any permutation the semantic similarity, subject matter similarity, one or more content provider computing device identifiers, and data of the event call, among others. Each of the bid value factors can be represented by a respective data structure and stored in the database 145. For example, the data structure for representing each of the bid value factors may be an row entry on a table, class object instantiation, structure (e.g., struct), and list, among others.

The bid value factor specifications can specify the generation of bid value factors based on the content provider computing device identifier or content provider computing device topic category. For example, with topic categories, the first content provider computing device 115 associated with electronics merchandiser A can set the bid value factor specifications such that the bid value factors generated by the content selector module 140 may be 5.0 for content items associated with a content provider computing device 115 associated with furniture retailers and 0.1 for content items associated with a content provider computing device 115 associated with electronics merchandiser B. In this example, the first content provider computing device 115 associated with the electronics merchandiser A can set the bid value factor specifications such that the bid value factors generated by the content selector module 140 may be 0.0 for content provider computing devices 115 associated with other electronics merchandisers, thereby eliminating selection of content items of the other electronics merchandisers.

The bid value factor specifications can specify the generation of bid value factors based on the subject matter similarity or the semantic similarity. For example, the first content provider can set the bid value factor specifications such that bid value factors generated by the content selector module 140 may be 3.0 for content items of content provider computing devices 115 whose relevance keywords have semantic similarity or subject matter similarity ranging between 10.5 and 46.3 and 4.0 for content items of content provider computing devices 115 whose relevance keywords have semantic similarity or subject matter similarity ranging between 46.4 and 100.

The bid value factor specifications can specify the generation of bid value factors based on the event call. The content selector module 140 can identify the event call including the action type for which the subject matter similarity or the semantic similarity was determined. The content selector module 140 can search the bid value factor specifications to find the event call specified in the bid value factor specifications. The content selector module 140 can generate the bid value factor based on the bid value specifications, responsive to finding the event call in the bid value factor specifications. For example, the first content provider computing device 115 can transmit the event call to the data processing system 110 but limit the use of the event call in selecting content items of other content provider computing devices 115. The first content provider computing device 115 can specify the bid value factor specifications such that such that bid value factors generated by the content selector module 140 for certain event calls with action types of purchasing a certain product (e.g., remote control) may be null. In this example, based on these bid factor value specifications, the content selector module 140 can generate the bid value factor to null for event calls specified in the bid value factor specification.

The content selector module 140 can determine, generate, or calculate a first bid value for the content item of the second content provider computing device 115 based on the first bid value factor and a second bid value for the content item of the third content provider 115 based on the second bid value factor. The content selector module 140 can retrieve the first bid value factor and the second bid value factor from the database. The content selector module 140 can receive an initial first bid value for the content item of the second content provider computing device 115 from the second content provider computing device 115. The content selector module 140 can an initial second bid value for the content item of the third content provider computing device 115 from the third content provider computing device 115. The content selector module 140 can store the initial first bid value and the initial second bid value onto the database 145. The content selector module 140 can adjust the initial first bid value by the first bid value factor and adjust the initial second bid value by the second bid value factor. For example, the content selector module 140 can factor the initial first bid value with the first bid value factor to calculate the first bid value and can factor the initial second bid value with the second bid value factor to calculate the second bid value. Adjusting the initial first value by the first bid value factor and the initial second bid value by the second bid value factor can be indicative of biasing selection of a content item among content items of content provider computing devices 115.

The content selector module 140 can select, for transmission to the client computing device associated with the account identifier, the content item of the second content provider based on the first bid value and the second bid value. For example, the content selector module 140 can determine that the first bid value for the content item of the second content provider computing device 115 is greater than the second bid value for the content item of the third content provider computing device 115. The content selector module 140 can determine that the first bid value for the content item of the second content provider computing device 115 is greater than the second bid value for the content item of the third content provider computing device 115 by a predetermined margin. The content selector module 140 can determine that the first bid value weighted based on the subject matter similarity or the semantic similarity between the relevance keyword for the second content provider computing device 115 is greater than the second bid value weighted based on the subject matter similarity or the semantic similarity for the relevance keyword of the third content provider computing device 115. For example, the content selector module in selecting between the content items of the second content provider computing device 115 and the third content provider computing device 115 can adjust or weigh the respective bid values by the semantic relevance between the respective relevance keywords and the search query received from the client computing device 125. The content selector module 140 can select a plural number of content items of a plurality of content provider computing devices 115 corresponding to the plural number of content items. For example, the content selector module 140 can select N content items corresponding to the N highest bid values factored by the respective bid value factors. Responsive to determining that the first bid value is greater than the second bid value, the content selector module 140 can select the content item of the second content provider.

The content selector module 140 can set a price value for the second content provider computing device 115 for selecting the content item of the second content provider computing device 115. The price value set for the second content provider computing device 115 can be, be proportional to, or indicative of a difference between the first initial bid value and the first bid value factored by the first bid value factor. For example, the price value can be indicative of the difference between the bid value that a content provider computing device 115 would have been set without participating in the online advertising framework versus the bid value factored by the bid value factor by participating in the online advertising framework making use of the data of the event call in selection of a content item of the respective content provider computing device. The price value set for the second content provider computing device 115 can be, be proportional to, or indicative of a difference between the second initial bid value of the third content provider computing device 115 and the first bid value factored by the first bid value factor. For example, the content selector module 140 can apply a second price auction scheme and set the price value to the second initial bid value of the third content provider computing device 115 for the second content provider computing device 115.

The content selector module 140 can set a commission value for the first content provider computing device 115 for the event call, responsive to selecting the content item of the first content provider computing device 115. The commission value can be indicative of the use of the event call data of the first content provider computing device 115 in the selection of the content item of the second content provider computing device 115. The content selector module 140 can set the commission value for the first content provider computing device 115 based on the price value for the second content provider computing device 115. For example, the price value set or calculated by the content selector module 140 can be a fraction of the difference between the first initial bid value and the first bid value of the first content provider computing device.

Figure 2A:
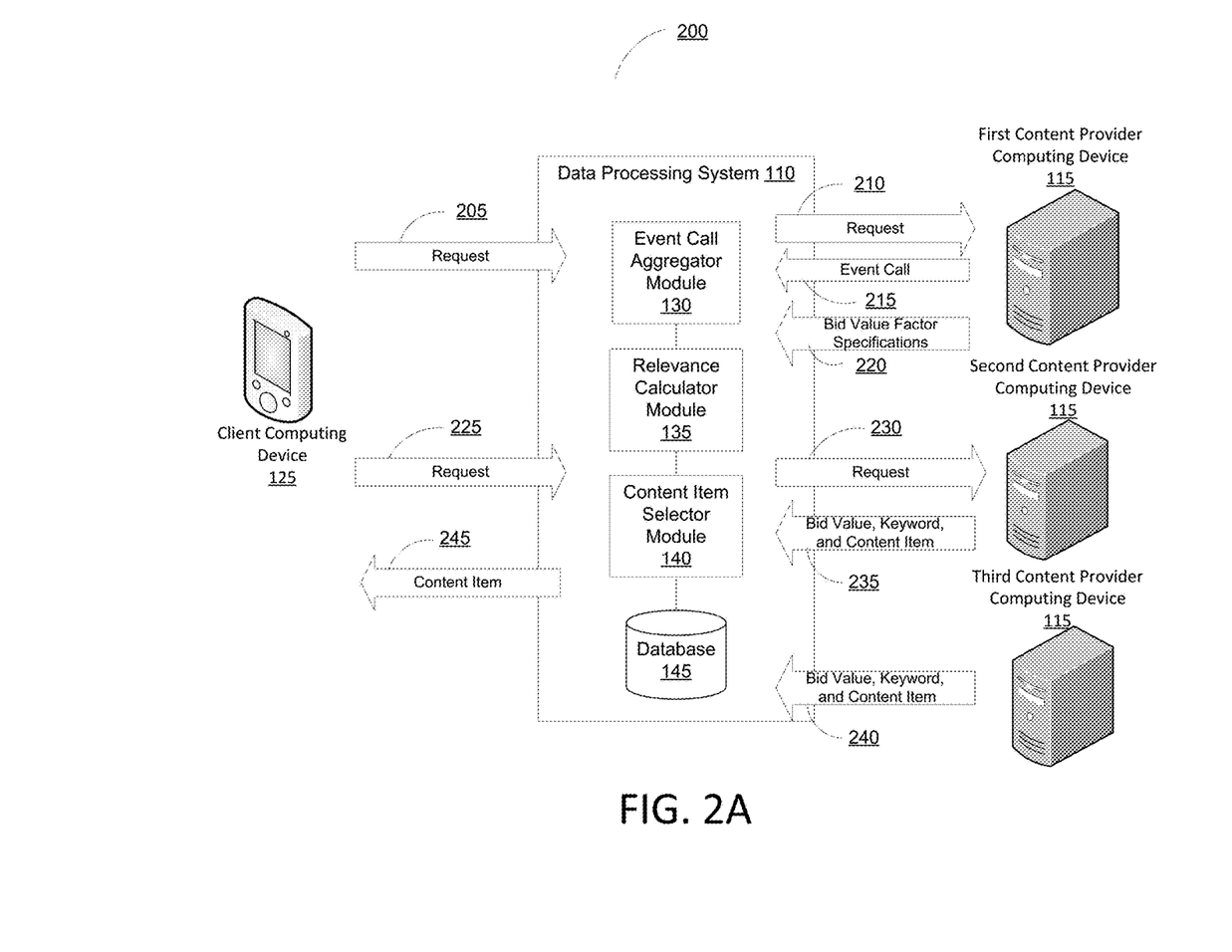
FIG. 2A is a block diagram depicting one example computer networked environment for selecting content items for an online ad campaign in a computerized network environment, according to an illustrative implementation.

FIG. 2A is a block diagram depicting one example computer networked environment 200 to select selecting content items for an online ad campaign, according to an illustrative implementation. Environment 200 can include a subset of the system 100, focusing on the transmission and receipt of data flows 205-245 between the data processing system 110 and the client computing device 125 and between the data processing system 110 and the first content provider computing device 115, second content provider computing device 115, and third content provider computing device 115.

In the example depicted in FIG. 2A, the data processing system 110 can receive or intercept a first request for content from the client computing device 125 (Flow 205). The first request for content can include an account identifier identifying the client computing device 125 and destination content provider identifier identifying the first content provider computing device 115. The first request can be directly from the client computing device 125 to the first content provider computing device 115. The first request can be, for example, making a purchase order on the website associated with the first content provider computing device 115. Using the destination content provider identifier included in the first request, the data processing system 110 can forward or otherwise transmit the first request from the client computing device 125 to the first content provider computing device 115 (Flow 210). Subsequent to the first content provider computing device 115 receiving the request, the data processing system 110 can receive an event call from the first content provider computing device 115 (Flow 215). The event call can include an account identifier identifying the client computing device 125 and action type indicating which type of action or activity that the client computing device 125 performed on an online content provided by the first content provider computing device 115. The data processing system 110 can anonymize the account identifier in the event call and store the event call in the database 145.

Independent of or subsequent to data flow 220, the data processing system 110 can receive bid value factors or bid value factor specifications from the first content provider computing device 115 (Flow 220). The bid value factor specifications can specify generation of bid value factors based on any permutation the semantic similarity, subject matter similarity, one or more content provider computing device identifiers, and data of the event call, among others.

Subsequently, the data processing system 110 can receive a second request from the client computing device 125 (Flow 225). The second request for content can include the account identifier identifying the client computing device 125 and a search query. Independent of or subsequent to data flows 205-225, the data processing system 110 can also receive the initial bid values, relevance keywords, and content items of the second content provider computing device 115 and the third content provider computing device 115 (Flows 235 and 240). The initial bid values, relevance keywords, and content items can be received by the data processing system 110 in any order or time. The relevance keyword can be designated by a second content provider computing device 115 and a third content provider computing device 115 and may indicate search query (e.g., strings) that the second content provider computing device 115 and the third content provider computing device 115 has designated as part of an online advertising campaign by setting initial bid values.

Using the search query, the action type of the event call, and a relevance keyword, the data processing system 110 can calculate a semantic similarity or a subject matter similarity among the search query, the action type, and the relevance keyword. To calculate the semantic similarity, the data processing system 110 can use query expansion algorithms, such as stemming, lemmatizing, and normalization, among others. To calculate the subject matter similarity, the data processing system 110 can use a subject matter network comprising a graph data structure that specifies relationship between nodes with each node corresponding to a word or phrase. Based on the semantic similarity or the subject matter similarity, the data processing system 110 can identify the second content provider computing device 115 or the third content provider computing device 115 designating the relevance keyword.

The data processing system 110 can generate a bid value factor based on the bid value factor specifications received from the first content provider computing device 115. The data processing system 110 can then calculate or adjust the bid values received from the second content provider computing device 115 and the third content provider computing device 115 by the respective bid value factors. The data processing system 110 can select the content item based on the bid values calculated based on the respective bid value factor. The data processing system 110 can determine that the bid value adjusted by the bid value factor of the second content provider computing device 115 is higher than the bid value adjusted by the bid value factor of the third content provider computing device 115. The data processing system 110 can forward the second request from the client computing device 125 to the second content provider computing device 125 based on the determination (Flow 230). The data processing system 110 can also select the content item of the second content provider computing device 115, and transmit the content item to the client computing device 125 (Flow 245).

Figure 2B:
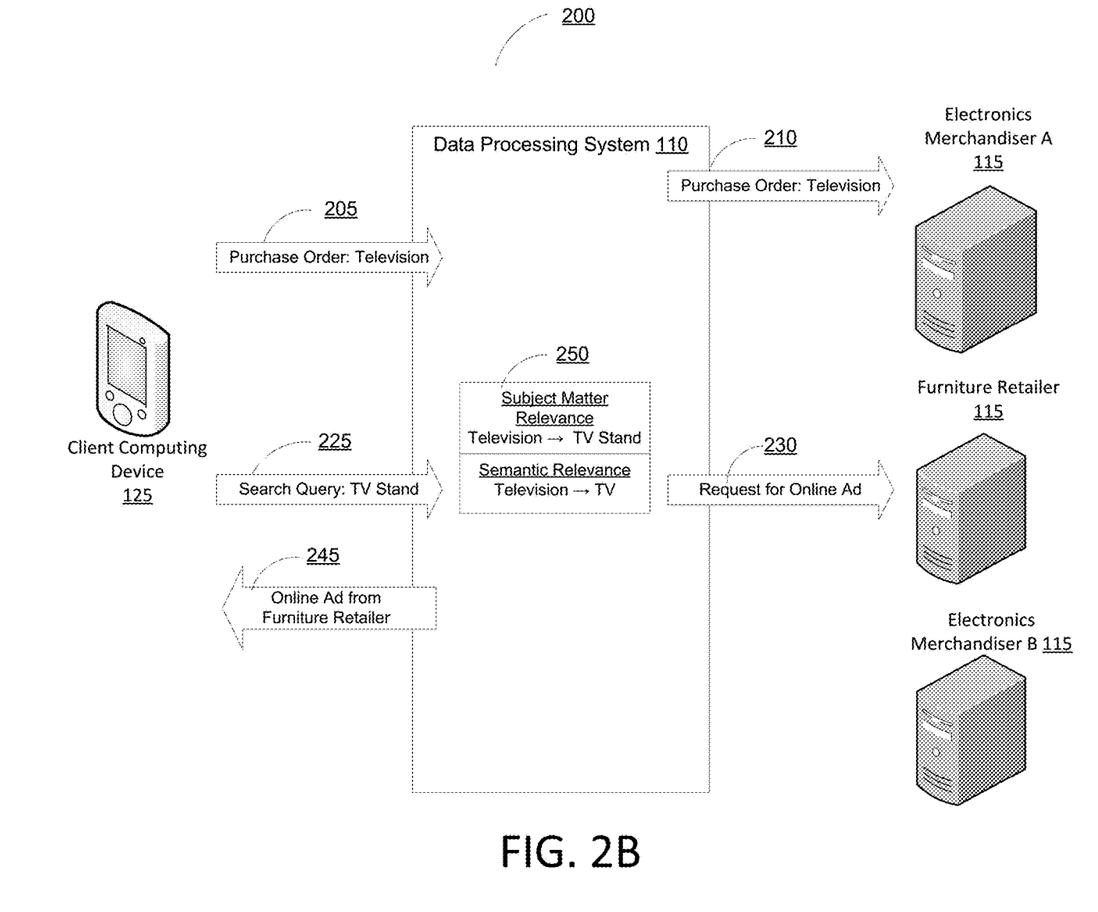
FIG. 2B is a block diagram depicting one example computer networked environment for selecting content items for an online ad campaign in a computerized network environment, according to an illustrative implementation.

FIG. 2B is a block diagram depicting one example computer networked environment 200 to select selecting content items for an online ad campaign, according to an illustrative implementation. Environment 200 depicted in FIG. 2B can include or be the same as the environment 200 depicted in FIG. 2A. Analogous to FIG. 2A, FIG. 2B focuses on the transmissions and receipt of data between the data processing system 110 and the client computing device 125 and between the data processing system 110 and electronics merchandiser A 115, furniture retailer 115, and electronics merchandiser B 115.

For example, the client computing device 125 can submit a purchase order for a television (Flow 205). The data processing system 110 can forward the purchase order to the electronics merchandiser A 115 (e.g., the first content provider computing device 115) (Flow 210). The electronics merchandiser A 115 in turn can transact on the purchaser order and transmit the event call recording the transaction back to the data processing system 110. Subsequently or independent of transmitting the event call, the electronics merchandiser A 115 can submit a bid value factor specifications. For example, the electronics merchandiser A 115 can specify that the bid value factor is to be 5.0 for furniture retailer 115 (e.g., the second content provider computing device 115) but 0.1 for other competing electronics merchandisers such as electronics merchandiser B 115 (e.g., the third content provider computing device 115).

Subsequently, (or in some instances previously) the client computing device 125 can submit a search query for "TV Stand" (Flow 225). The data processing system 110 can determine the subject matter relevance or semantic relevance between the search query and the event call previously received from the electronics merchandiser A 115 (250). For example, the data processing system 110 can determine that there is a subject matter similarity between the search query "TV Stand" and the event call record "Television" based on the associations specified in a subject matter network defining nodes corresponding to these two words and specifying that these nodes are related. The data processing system 110 can also determine that there is a semantic similarity between the token "TV" in the search query and the event call record "Television" based on query abbreviation.

Subsequently or independently of the search query, the furniture retailer 115 and the electronics merchandiser B 115 can each submit a relevance keyword, a bid value, and an online ad. The relevance keyword can be designated by content providers 115 such as the furniture retailer 115 and the electronics merchandiser B 115 as part of their advertising campaigns. For example, the relevance keyword of the furniture retailer 115 may be "Furniture" and the relevance keyword of the electronics merchandiser B 115 may be "TV Accessory." The data processing system 110 can also determine the subject matter relevance or semantic relevance between the search query and the relevance keywords submitted by the furniture retailer 115 and the electronics merchandiser B 115. For example, the data processing system 110 can determine that there is a subject matter similarity between the search query "TV Stand" and the relevance keyword "Furniture" using a subject matter network defining nodes corresponding to these two words and specifying that these nodes are related. The data processing system 110 can also determine that there is a semantic relevance between the "TV" of the search query "TV Stand" and the "TV" of the relevance keyword "TV accessory" based on the identity of these two words.

In selecting the online ad to serve, the data processing system 110 can also adjust the bid values received from the furniture retailer 115 and the electronics merchandiser B 115 by the bid value factor specifications received from the electronics merchandiser A 115. In this example, using the bid value factor specifications of the electronics merchandiser A 115, the data processing system 110 can factor the bid value 20.0 of the furniture merchandiser B 115 is to be factored by 5.0 resulting in an adjusted bid value of 100.0. The data processing system 110 can also factor the bid value 20.0 of the furniture merchandiser B 115 is to be factored by 0.1 resulting in an adjusted bid value of 2.0. The data processing system 110 can then compare the two adjusted bid values, determine that the adjusted bid value of the furniture merchandiser 115 is greater than the adjusted bid value of the electronics merchandiser B 115, and select the online ad of the furniture merchandiser 115. The data processing system 110 can send a request for the online ad from the furniture retailer 115 (Flow 230). In turn, the furniture retailer 115 can transmit the online ad from the furniture merchandiser 115. The data processing system 110 can then forward the online ad from the furniture retailer to the client device 125 (Flow 245). In this example, the electronics merchandiser A 115, furniture retailer 115, and the electronics merchandiser B 115 do not share Internet activity log data with one another directly. Rather, the data processing system 110 can act as the intermediary to facilitate the utilization event call logs to select online ads.

Figure 3:
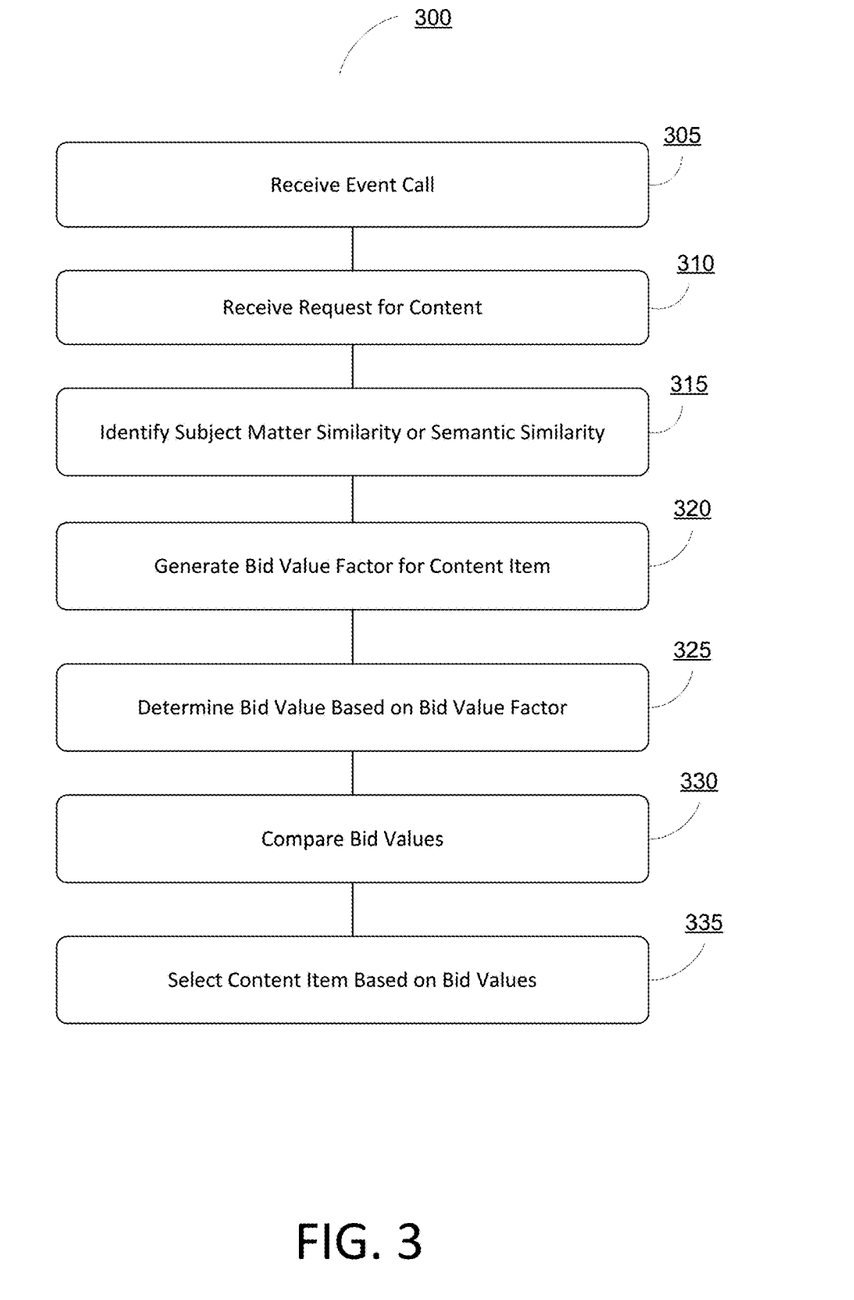
FIG. 3 is a flow diagram depicting one example method of selecting content items for an online ad campaign in a computerized network environment, according to an illustrative implementation.

FIG. 3 is a flow diagram depicting an example method 300 of selecting content items for an online ad campaign in a computerized network, according to an illustrative implementation. The functionality described herein with respect to method 300 can be performed or otherwise executed by the data processing system 110 or the various modules of the data processing system 110 shown in FIG. 1. The method 300 can be performed or executed at various time intervals, ranging from once every few seconds or minutes to once every predetermined number of days. The method 300 can be performed or executed upon the fulfillment of a conditional, e.g., a condition determined or received by the data processing system 110 such as accumulating a predetermined number of the plurality of first parameters and the plurality of second parameters.

The method 300 can receive an event call (ACT 305). For example, the event call aggregator module 130 of the data processing system 110 can receive the event call from a first content provider computing device 115. The event call can be indicative of an action by the client computing device 125 with the first content provider computing device 115 and be logged at a database associated with the content provider computing device 115. The event call can include an account identifier, account identifier type, source identifier, action type, action descriptors. The event call aggregator module 130 can aggregate, maintain, or otherwise store the event call onto one or more databases 140 of the data processing system 110.

The method 300 can receive a request for content (ACT 310). For example, the data processing system 110 can receive or intercept a request for content from the client computing device 115. The request for content can include an account identifier, a search query, and a content provider computing device identifier identifying the one of the content provider computing devices 120 that the request is to be forwarded to, among others. The data processing system 110 can process the request (e.g., by applying any number of natural language processing algorithms on the search query of the request) and forward the request to the respective content provider computing device 115.

The method 300 can identify subject matter or semantic similarity (ACT 315). For example, the subject matter similarity and the semantic similarity can each include a similarity measure, score, or distance, indicating the relatedness of the action type, the relevance keyword, and the search query of the request to one another. The relevancy keyword can be designated by a content provider computing device 115 to make use of data contained in the event call in selecting content items of the respective content provider computing device 115. The relevance calculator module 135 of the data processing system 110 can determine the subject matter similarity among the action type including action descriptors, the relevance keyword, and the search query of the request using a subject matter network. The subject matter network may be a data structure comprising a unidirectional or bidirectional graph identifying predefined relationships and distances between each node that corresponds to a word or a phrase. The relevance calculator module 135 can determine the semantic similarity among the action type including action descriptors, the relevance keyword, and the search query of the request using query expansion algorithms, such as normalization, stemming, or lemmatizing algorithms.

The method 300 can generate a bid value factor for a content item (ACT 320). For example, the data processing system 110 can receive bid value specifications from the first content provider computing device 115. The bid value specifications may indicate how to bias the bid values of the one or more content provider computing devices 115 in the selection of content item. The bid value specifications may specify generation of the bid value factors based on any permutation the semantic similarity, subject matter similarity, one or more content provider computing device identifiers, and data of the event call, among others. The data processing system 110 can also generate or adjust the bid value factor based on the semantic similarity or the subject matter similarity. Each of the bid value factors can be represented in a data structure and stored in the database 140.

The method 300 can determine a bid value based on the bid value factors (ACT 325). For example, the data processing system 110 can receive a first initial bid value for a content item of the second content provider computing device 115 and a second initial bid value for a content item of the third content provider computing device 115 from the respective content provider computing device 115. The data processing system 110 can calculate the first bid value for the second content provider computing device 115 by factoring the first initial bid value by the first bid value factor. The data processing system 110 can calculate the second bid value for the third content provider computing device 115 by factoring the second initial bid value by the second bid value factor.

The method 300 can compare bid values (ACT 330). For example, the content selector module 140 can determine which bid value factored by the respective bid value factors is the highest among the bid values determined for each content item of the one or more content provider computing devices 115. The content selector module 140 can compare whether any of bid values factored by the respective bid value factor are greater than any of the other bid value factors by the respective bid value factor by a predetermined margin.

The method 300 can select the content item based on the bid values (ACT 335). For example, the content selector module 140 can select the content item corresponding to the highest bid value factored by the bid value factor. The content selector module 140 can N content items corresponding to the N highest bid values factored by the respective bid value factor. The content selector module 140 can then transmit the selected content item or content items to the client computing device 125. The content selector module 140 can also set a price value for the second content provider computing device 115 based on the second initial bid value of the third content provider computing device 115 (e.g., via second price auction). The content selector module 140 can set a commission value for the event call of the first content provider computing device 115 based on the price value set for the first content provider computing device 115.

Figure 4:
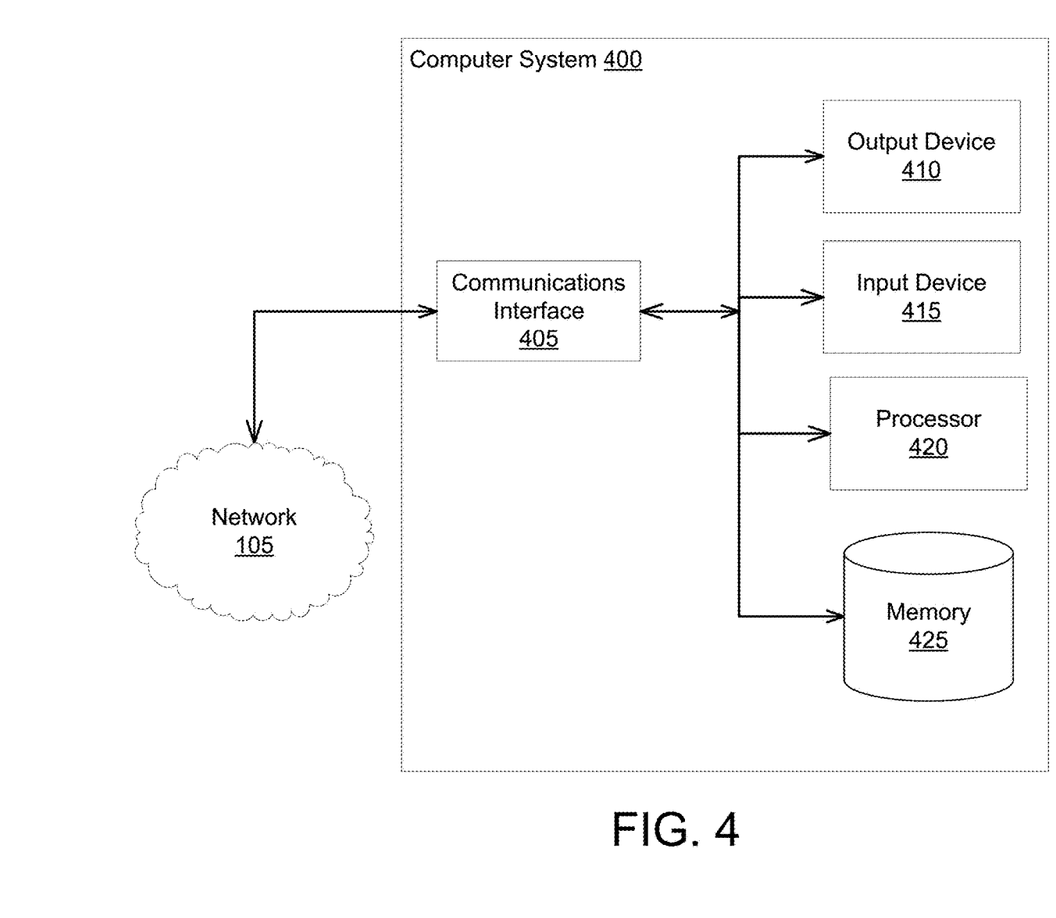
FIG. 4 is a block diagram illustrating a general architecture for a computer system that may be employed to implement elements of the systems and methods described and illustrated herein, according to an illustrative implementation.

FIG. 4 is a block diagram illustrating a general architecture for a computer system 400 that may be employed to implement elements of the systems and methods described and illustrated herein, according to an illustrative implementation. The computer system or computing device 400 can include, be part of, or be used to implement the system 100, data processing system 110, event call aggregator module 130, relevance calculator module 135, or the content selector module 140. The computing system 400 includes a communications interface 405 or other communication component for communicating information and a processor 420 or processing circuit coupled to the communications interface 405 for processing information. The computing system 400 can also include one or more processors 410 or processing circuits coupled to the bus for processing information. The computing system 400 also includes main memory 425, such as a random access memory (RAM) or other dynamic storage device, coupled to the interface 405 for storing information, and instructions to be executed by the processor 420. Main memory 425 can also be used for storing position information, temporary variables, or other intermediate information during execution of instructions by the processor 420. The computing system 400 may further include a read only memory (ROM) 425 or other static storage device coupled to the interface 405 for storing static information and instructions for the processor 420. A storage device, such as a solid state device, magnetic disk or optical disk, is coupled to the interface 405 for persistently storing information and instructions.

The computing system 400 may be coupled via the interface 405 to a display, such as a liquid crystal display, or active matrix display, for displaying information to a user. An input device 415, such as a keyboard including alphanumeric and other keys, may be coupled to the interface 405 for communicating information and command selections to the processor 420. The input device 415 can include a touch screen display. The input device 415 can also include a cursor control, such as a mouse, a trackball, or cursor direction keys, for communicating direction information and command selections to the processor 420 and for controlling cursor movement on the display.

The processes, systems and methods described herein can be implemented by the computing system 400 in response to the processor 420 executing an arrangement of instructions contained in main memory 425 or read only memory (ROM) 425. Such instructions can be read into main memory 425 from another computer-readable medium, such as the storage device 425. Execution of the arrangement of instructions contained in main memory 425 causes the computing system 400 to perform the illustrative processes described herein. One or more processors in a multi-processing arrangement may also be employed to execute the instructions contained in main memory 425. In alternative implementations, hardwired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular implementations of the subject matter have been described. Other implementations are within the scope of the following claims. While operations are depicted in the drawings in a particular order, this should not be understood as requiring that such operations be performed in the particular order shown or in sequential order, or that all illustrated operations are required to be performed. Actions described herein can be performed in a different order. In addition, the processes depicted in the accompanying figures do not necessarily require the particular order shown, or sequential order, to achieve desirable results. In certain implementations, multitasking and parallel processing may be advantageous.

The separation of various system components does not require separation in all implementations, and the described program components can be included in a single hardware or software product. For example, the event call aggregator module 130, relevance calculator module 135, and the content item selector module 140 can be a single module, a logic device having one or more processing circuits, or part of an online content item placement system.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of selecting content items for an online ad campaign in a computerized network environment, comprising:
   receiving, by a data processing system having one or more processors and a database, from a first content provider computing device, an event call comprising an account identifier and an action type, wherein the account identifier includes one or more client device identifiers of client devices that performed the action type;
   receiving, by the data processing system and from a client computing device, a request for content comprising a search query, wherein the client computing device is associated with the account identifier;

determining, by the data processing system and based at least on a determination that the client computing device is associated with one of the one or more client device identifiers that performed the action type, one of a subject matter similarity and a semantic similarity between the search query of the request for content and a relevance keyword, wherein the relevance keyword is designated by a second content provider computing device and by a third content provider computing device;

generating, by the data processing system and based at least on a determination that the client computing device is associated with one of the one or more client device identifiers that performed the action type, a first bid value factor for a content item of the second content provider computing device and a second bid value factor for a content item of the third content provider computing device, wherein each of the first bid value factor and the second bid value factor are based at least on the subject matter similarity or the semantic similarity between the search query of the request for content and the relevance keyword, wherein the first bid value factor and the second bid value factor are each represented by a respective data structure and stored in the database;

determining, by the data processing system, a first bid value for the content item of the second content provider computing device based on the first bid value factor retrieved from the database and a second bid value for the content item of the third content provider computing device based on the second bid value factor retrieved from the database; and selecting, by the data processing system via an online auction, for transmission to the client computing device associated with the account identifier, the content item of the second content provider computing device based on the first bid value and the second bid value.

2. The method of claim 1, comprising:
determining, by the data processing system, one of the subject matter similarity and the semantic similarity between the search query of the request for content and the relevance keyword based on a subject matter network stored on the database, the subject matter network specifying a relatedness distance between the search query of the request for content and the relevance keyword.

3. The method of claim 1, comprising:
generating, by the data processing system, the first bid value factor and the second bid value factor based on bid value factor specifications, the bid value factor specifications specifying the generation of the first bid value factor and the second bid value factor based on a second content provider computing device identifier and a third content provider computing device identifier.

4. The method of claim 1, comprising:
receiving, by the data processing system, from the first content provider computing device, an event call comprising the account identifier, the action type, and a product identifier; and
generating, by the data processing system, the first bid value factor and the second bid value factor for based on bid value factor specifications, the bid value factor specifications specifying the generation of the first bid value factor and the second bid value factor based on the product identifier.

5. The method of claim 1, comprising:
determining, by the data processing system, that the first bid value is greater than the second bid value; and
selecting, by the data processing system, for transmission to the client computing device associated with the account identifier, the content item of the second content provider computing device, responsive to determining that the first bid value is greater than the second bid value.

6. The method of claim 1, comprising:
determining, by the data processing system, that the first bid value is greater than the second bid value by a predetermined threshold; and
selecting, by the data processing system, for transmission to the client computing device associated with the account identifier, the content item of the second content provider computing device, responsive to determining that the first bid value is greater than the second bid value by the predetermined threshold.

7. The method of claim 1, comprising:
restricting, by the data processing system, the content item of the third content provider computing device based on the second bid value.

8. The method of claim 1, comprising:
setting, by the data processing system, a commission value for the first content provider computing device for the event call; and
setting, by the data processing system, a price value for the second content provider computing device for selecting the content item.

9. A system for selecting content items for an online ad campaign in a computerized network environment, comprising:
a database; and
a data processing system, comprising one or more processors, configured to:
receive from a first content provider computing device, an event call comprising an account identifier and an action type, wherein the account identifier includes one or more client device identifiers of client devices that performed the action type;
receive from a client computing device, a request for content comprising a search query, wherein the client computing device is associated with the account identifier;
determine, based at least on a determination that the client computing device is associated with one of the one or more client device identifiers that performed the action type, one of a subject matter similarity and a semantic similarity between the search query of the request for content and a relevance keyword, wherein the relevance keyword is designated by a second content provider computing device and by a third content provider computing device;
generate, based on the determination that the client computing device is associated with the one or more client device identifiers that performed the action type, a first bid value factor for a content item of the second content provider computing device and a second bid value factor for a content item of the third content provider computing device, wherein each of the first bid value factor and the second bid value factor are based at least on the subject matter similarity or the semantic similarity between the search query of the request for content and the relevance keyword, wherein the first bid value factor and the second bid value factor are each represented by a respective data structure and stored in the database;

determine a first bid value for the content item of the second content provider computing device based on the first bid value factor retrieved from the database and a second bid value for the content item of the third content provider computing device based on the second bid value factor retrieved from the database; and select, via an online auction, for transmission to the client computing device associated with the account identifier, the content item of the second content provider computing device based on the first bid value and the second bid value.

10. The system of claim 9, comprising:
the data processing system configured to determine one of the subject matter similarity and the semantic similarity between the search query of the request for content and the relevance keyword based on a subject matter network stored on the database, the subject matter network specifying a relatedness distance between the search query of the request for content request and the relevance keyword.

11. The system of claim 9,
the data processing system configured to generate the first bid value factor and the second bid value factor based on bid value factor specifications, the bid value factor specifications specifying the generation of the first bid value factor and the second bid value factor based on a second content provider computing device identifier and a third content provider computing device identifier.

12. The system of claim 9, comprising:
the data processing system configured to generate the first bid value factor and the second bid value factor for based on bid value factor specifications, the bid value factor specifications specifying a product identifier; and
wherein an event call comprises the product identifier.

13. The system of claim 9, comprising:
the data processing system configured to:
determine that the first bid value is greater than the second bid value; and
select for transmission to the client computing device associated with the account identifier, the content item of the second content provider computing device, responsive to determining that the first bid value is greater than the second bid value.

14. The system of claim 9, comprising:
the data processing system configured to:
determine that the first bid value is greater than the second bid value by a predetermined threshold; and
select for transmission to the client computing device associated with the account identifier, the content item of the second content provider computing device, responsive to determining that the first bid value is greater than the second bid value by the predetermined threshold.

15. The system of claim 9, comprising:
the data processing system configured to:
restrict the content item of the third content provider computing device based on the second bid value.

16. The system of claim 9, comprising:
the data processing system configured to:
set a commission value for the first content provider computing device for the event call; and
set a price value for the second content provider computing device for selecting the content item.

* * * * *